(12) United States Patent
Jang et al.

(10) Patent No.: US 11,719,204 B2
(45) Date of Patent: Aug. 8, 2023

(54) CONTROLLER INTEGRATED TYPE FUEL PUMP MODULE FOR PREVENTING THERMAL DEFORMATION OF FLANGE

(71) Applicant: COAVIS, Sejong-si (KR)

(72) Inventors: Young Sub Jang, Sejong-si (KR); Hyug Jin Lee, Sejong-si (KR)

(73) Assignee: COAVIS, Sejong-Shi (KR)

( * ) Notice: Subject to any disclaimer, the term of this patent is extended or adjusted under 35 U.S.C. 154(b) by 27 days.

(21) Appl. No.: 16/929,619

(22) Filed: Jul. 15, 2020

(65) Prior Publication Data
US 2021/0017941 A1   Jan. 21, 2021

(30) Foreign Application Priority Data
Jul. 17, 2019   (KR) .......................... 10-2019-0086407

(51) Int. Cl.
*F02M 37/10* (2006.01)
*F02M 37/00* (2006.01)

(52) U.S. Cl.
CPC ...... *F02M 37/103* (2013.01); *F02M 37/0011* (2013.01)

(58) Field of Classification Search
CPC .... F02M 31/20; F02M 37/103; F02M 37/106; F02M 37/085; F02M 59/44; F04D 29/58; F04D 29/5813
USPC ........................................................ 123/509
See application file for complete search history.

(56) References Cited

U.S. PATENT DOCUMENTS

| | | | |
|---|---|---|---|
| 9,657,698 B2* | 5/2017 | Park ..................... | F02M 37/007 |
| 2003/0059659 A1* | 3/2003 | Kamo ................. | H01M 8/1009 |
| | | | 429/456 |
| 2005/0100461 A1* | 5/2005 | Izutani ................... | F02M 37/50 |
| | | | 417/423.8 |
| 2009/0031995 A1* | 2/2009 | Tateishi ............... | F02M 37/103 |
| | | | 123/509 |
| 2009/0103268 A1* | 4/2009 | Bryan ................ | H05K 7/20854 |
| | | | 361/711 |
| 2011/0192381 A1* | 8/2011 | Maruyama ............. | F02M 37/08 |
| | | | 123/497 |

(Continued)

FOREIGN PATENT DOCUMENTS

| | | |
|---|---|---|
| DE | 102014112048 A1 | 6/2015 |
| DE | 112015005665 T5 | 8/2017 |

(Continued)

OTHER PUBLICATIONS

Germany Office Action for 10 2020 118 920.6 dated Feb. 24, 2021.

*Primary Examiner* — John Kwon
*Assistant Examiner* — Johnny H Hoang
(74) *Attorney, Agent, or Firm* — Nixon Peabody LLP

(57) ABSTRACT

Provided are a controller integrated type fuel pump module for preventing thermal deformation of a flange and a manufacturing method thereof. An embodiment of the present invention is directed to providing a controller integrated type fuel pump module for preventing thermal deformation of a flange that minimizes heat transfer from a board to the flange through a thermal insulation effect by an air gap by improving a structure in a storage part of a controller to form the air gap between the board and the flange in the controller formed integrally with a fuel pump module, and a manufacturing method thereof.

6 Claims, 10 Drawing Sheets
(2 of 10 Drawing Sheet(s) Filed in Color)

(56) References Cited

U.S. PATENT DOCUMENTS

2012/0000556 A1\* 1/2012 Baek ..................... F04D 5/002
  137/565.17
2017/0306911 A1\* 10/2017 Jang ..................... F16B 11/006

FOREIGN PATENT DOCUMENTS

| DE | 102017003907 A1 | 10/2017 |
| KR | 101821588 B1 | 1/2018 |
| WO | 2019001826 A1 | 1/2019 |

\* cited by examiner

CONTROLLER INTEGRATED TYPE FUEL PUMP MODULE FOR PREVENTING THERMAL DEFORMATION OF FLANGE

CROSS-REFERENCE TO RELATED APPLICATIONS

This application claims priority under 35 U.S.C. § 119 to Korean Patent Application No. 10-2019-0086407, filed on Jul. 17, 2019, in the Korean Intellectual Property Office, the disclosure of which is incorporated herein by reference in its entirety.

TECHNICAL FIELD

The following disclosure relates to a controller integrated type fuel pump module and a manufacturing method thereof, and more particularly, to a controller integrated type fuel pump module for preventing thermal deformation of a flange that may effectively discharge heat generated from electronic components provided in the fuel pump module to the outside and may effectively prevent the thermal deformation of the flange through a structural improvement of the fuel pump module, and a manufacturing method thereof.

BACKGROUND

A fuel pump module is installed in a fuel tank of a vehicle to transmit fuel stored in the fuel tank to an injector side of an engine. Such a fuel pump module may be configured to include a fuel pump, a filter for removing impurities by filtering the fuel pumped by the fuel pump, a reservoir cup fixed to the fuel tank and having the fuel pump and the filter installed therein, a bracket for fixing the fuel pump to the reservoir cup, a flange (or a holder cap) for fixing the fuel pump and the reservoir cup to the fuel tank, and the like.

The fuel pump module is also provided with electronic components that control an operation of the fuel pump, and the electronic components are collectively referred to as a controller. The controller may be divided into a separated type formed detachably from the flange or an integrated type formed integrally with the flange, depending on a connection form with the flange. The separated type controller has an advantage that the degree of freedom is high in a connection position of a wiring when assembling the fuel pump module and the integrated type controller has an advantage that a production efficiency is improved by reducing the number of components and the number of assembly processes. As such, since the controller has the advantages according to each type, the separated type and integrated type controllers may be appropriately applied according to the needs of a user.

Various electronic components such as a board, a terminal, and a field effect transistor (FET) are accommodated in the controller, and in the electronic components, considerable heat is generated as a current flows. Such heat generation has various adverse effects such as deteriorating a performance of the electronic components or unnecessarily evaporating the fuel. In particular, such heat generation is a cause of thermal deformation of the flange, and when the flange is deformed, structural stability of the entire apparatus is collapsed, and there is a high risk of occurrence of a major problem such as damage to the components of each part due to the collapsed structural stability is also accelerated.

In order to solve such a problem, it is necessary to effectively dissipate the heat generated from the controller. Therefore, various types of heat dissipation parts are generally formed in the controller. Korean Patent No. 1821588 ("FUEL PUMP MODULE AND METHOD FOR IMPROVING RADIANT HEAT", Jan. 18, 2018, hereinafter, referred to as 'Related Art Document') discloses a technology in which heat generated from an electronic component such as a printed circuit board is effectively transferred to a heat sink through a liquid resin to perform heat dissipation by injecting the liquid resin into the entire space in which electronic components such as PCBs are embedded in the controller and forming the heat sink on a top surface of the controller. As such, in the related art document, the liquid resin serves as a heat dissipation member. At this time, the liquid resin also serves as a molding member that fixes an electric parts (electronic components), heat dissipation parts (heat sinks), and guide parts (guides for fixing the heat sinks). The related art document has very good effects that potting of the liquid resin is made easier than the conventional potting and an area of the heat sink may be made much wider than the conventional area, regardless of the potting process by improving a structure in which the heat sink is inserted into the guide.

As such, the related art document discloses the technology that has good effects of improving heat dissipation performance while increasing the ease of manufacture (by expanding the area of the heat sink), but the following problems were found during actual operation. As described above, the liquid resin serves as the heat dissipation member and the molding member, the heat is effectively transferred to the heat sink (also the liquid resin is in direct contact) through the liquid resin in direct contact with electronic components such as the PCB, and the heat is radiated from the heat sink to external air, thereby making it possible to smoothly discard the heat generated from the electronic components to the outside. However, the liquid resin is in contact with the flange as well as the heat sink, and thus the heat generated from the electronic components is also transferred to the flange. However, in general, a material of the flange is POM, PPA, or the like, and an allowable temperature range thereof is considerably lower than that of a PCB or IC product. Accordingly, there was a problem that the flange is thermally deformed by the heat generated from the electronic components and transferred to the flange.

Accordingly, it is required to improve the structure that may effectively prevent the thermal deformation of the flange while maintaining the advantages of the related art document, that is, the effects of ease of manufacture and improvement in the heat dissipation performance by further improving a heat generation structure of the related art document.

RELATED ART DOCUMENT

Patent Document (Patent Document 1) 1. Korean Patent No. 1821588 ("FUEL PUMP MODULE AND METHOD FOR IMPROVING RADIANT HEAT", Jan. 18, 2018)

SUMMARY

An embodiment of the present invention is directed to providing a controller integrated type fuel pump module for preventing thermal deformation of a flange that minimizes heat transfer from a board to the flange through a thermal insulation effect by an air gap by improving a structure in a storage part of a controller to form the air gap between the board and the flange in the controller formed integrally with a fuel pump module, and a manufacturing method thereof.

In one general aspect, a controller integrated type fuel pump module in which a controller 100 is integrally formed on a flange 500 that fixes a fuel pump and a reservoir cup to a fuel tank includes: a storage part 110 including a storage member 111 in which an upper surface is opened and an inner space is formed and a potting part guide 112 protruding from an inner surface of the storage member 111, and formed on an upper surface of the flange 500; an electric part 120 including a board 121 having an edge disposed across the potting part guide 112 to vertically divide an inner space of the storage part 110 into an upper space V1 and a lower space V2 together with the potting part guide 112, and generating heat; a heat dissipation part 130 disposed on an upper surface of the storage part 110 and discharging heat generated from the electric part 120 to the outside; and a potting part 140 formed by potting a liquid resin to the upper space V1 and transferring the heat generated from the electric part 120 to the heat dissipation part 130.

The heat dissipation part 130 may include a heat sink 131 formed to have a size corresponding to an area of the storage part 110 to cover and seal an opened surface of the storage part 110; and a plurality of heat sink fins 132 formed on the heat sink 131.

An edge of the heat sink 131 may be bonded to an upper end of the storage member 111.

The heat dissipation part 130 may include a connection part 133 formed on a lower portion of the heat sink 131 and having a lower surface in surface contact with the electric part 120, the storage part 110 may include a heat dissipation part guide 113 formed in a shape corresponding to the connection part 133, and the connection part 133 may be inserted into the heat dissipation part guide 113.

The heat dissipation part guide 113 may be made of a member separate from the storage member 111 and may be coupled to the electric part 120.

The heat dissipation part guide 113 may be made of a member separate from the storage member 111, a coupling protrusion 113a that is in contact with the inner surface of the storage member 111 may be formed at an end of the heat dissipation part guide 113, and a coupling groove 113b into which the coupling protrusion 113a is inserted may be formed on the inner surface of the storage member 111, and the coupling protrusion 113a may be fitted into the coupling groove 113b so that the heat dissipation part guide 113 may be coupled to the storage member 111.

In another general aspect, a manufacturing method of the controller integrated type fuel pump module of claim as described above includes: an electric part installation operation of disposing an edge of the board 121 across the potting part guide 112; a potting part installation operation of potting the liquid resin to the upper space V1 of the inner space of the storage part 110 vertically divided by the board 121 and the potting part guide 112; and a heat dissipation part installation operation of disposing the heat dissipation part 130 on the upper surface of the storage part 110.

In another general aspect, a manufacturing method of the controller integrated type fuel pump module including the heat dissipation part guide 113 and the connection part 133 includes: an electric part installation operation of disposing an edge of the board 121 across the potting part guide 112; a guide installation operation of installing the heat dissipation part guide 113 in the upper space V1 of the inner space of the storage part 110 vertically divided by the board 121 and the potting part guide 112; a potting part installation operation of potting the liquid resin to a space other than the heat dissipation part guide 113 of the upper space V1; and a heat dissipation part installation operation of inserting the connection part 133 into the heat dissipation part guide 113 to dispose the heat dissipation part 130 on the upper surface of the storage part 110.

The heat dissipation part guide 113 may be made of a member separate from the storage member 111, and in the guide installation operation, the heat dissipation part guide 113 may be coupled to the electric part 120.

The heat dissipation part guide 113 may be made of a member separate from the storage member 111, a coupling protrusion 113a that is in contact with the inner surface of the storage member 111 may be formed at an end of the heat dissipation part guide 113, and a coupling groove 113b into which the coupling protrusion 113a is inserted may be formed on the inner surface of the storage member 111, and in the guide installation operation, the coupling protrusion 113a may be fitted into the coupling groove 113b so that the heat dissipation part guide 113 may be coupled to the storage member 111.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF EMBODIMENTS

Hereinafter, a controller integrated type fuel pump module for preventing thermal deformation of a flange having the configuration as described above and a manufacturing method thereof according to the present invention will be described in detail with reference to the accompanying drawings.

[1] First Embodiment

FIGS. 1 to 4 illustrate a first embodiment which is the most basic form of a fuel pump module according to the present invention, and a basic configuration of a controller integrated type fuel pump module for preventing thermal deformation of a flange and a manufacturing method thereof according to the present invention will be described in detail with reference to FIGS. 1 to 4.

Figure 1:
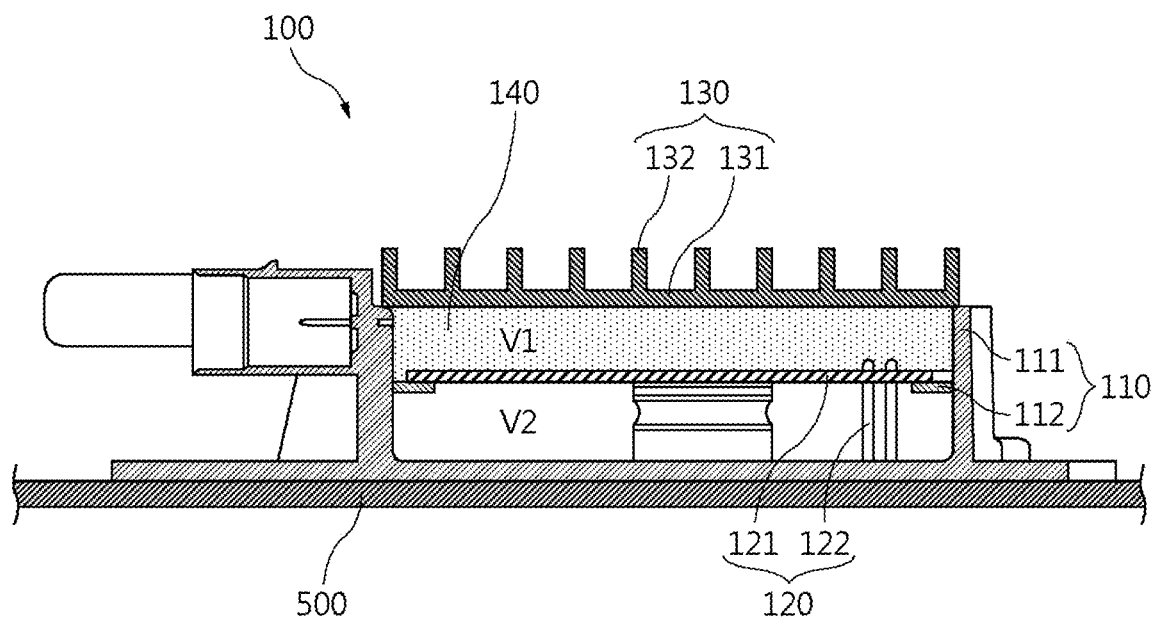
FIG. 1 is a cross-sectional view of a first embodiment of a fuel pump module according to the present invention.

The fuel pump module according to the present invention is a controller integrated type fuel pump module in which a controller 100 is integrally formed on a flange 500 that fixes a fuel pump and a reservoir cup to a fuel tank. FIG. 1 is a cross-sectional view of a first embodiment of a fuel pump module according to the present invention, and the fuel pump module according to the present invention includes a storage part 110, an electric part 120, a heat dissipation part 130, and a potting part 140, as illustrated in FIG. 1.

The storage part 110 includes a storage member 111 in which an upper surface is opened and an inner space is formed, and is formed on an upper surface of the flange 500 to serve to store or support other components such as the electric part 120. In particular, the storage part 110 includes potting part guide 112 protruding from an inner surface of the storage member 111.

The electric part 120 includes a board 121, a terminal 122 for transmitting and receiving signals to and from the fuel pump, a FET provided for signal amplification, and the like. As the electric part 120 is operated, a considerable amount of heat is generated, and thus, the electric part 120 becomes a substantial heating part in the fuel pump module. That is, the heat dissipation part 130, the potting part 140, and the like are provided to effectively dissipate the heat generated from the electric part 120.

Figure 2:
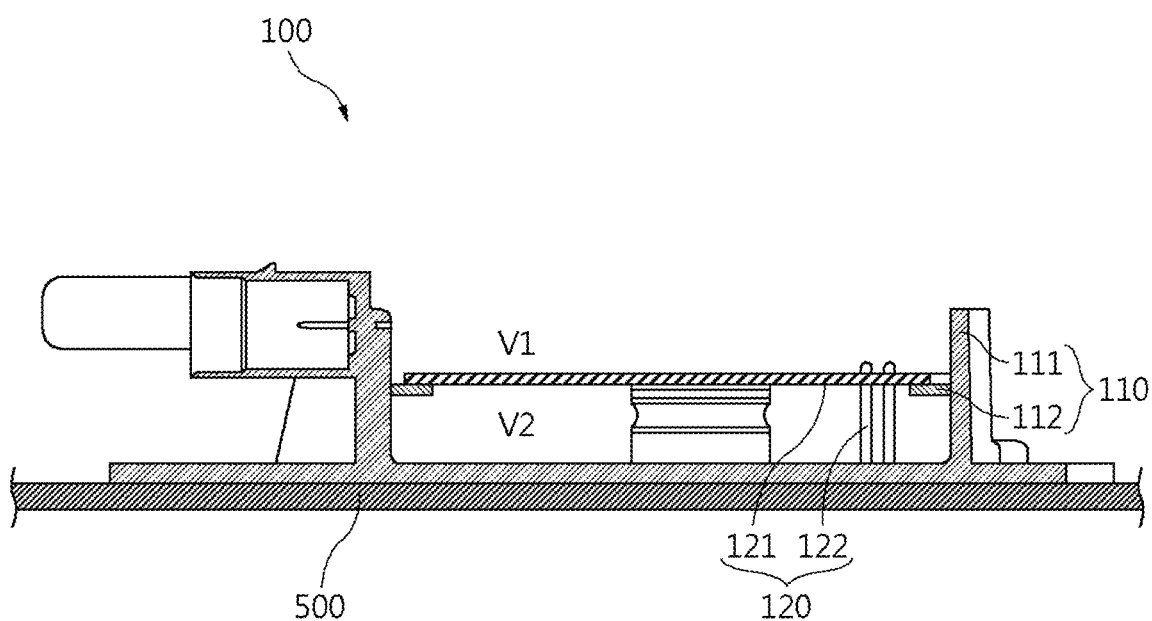
FIG. 2 is a cross-sectional view before a potting part and a heat dissipation part of the first embodiment of the fuel pump module according to the present invention are coupled.
Figure 3:
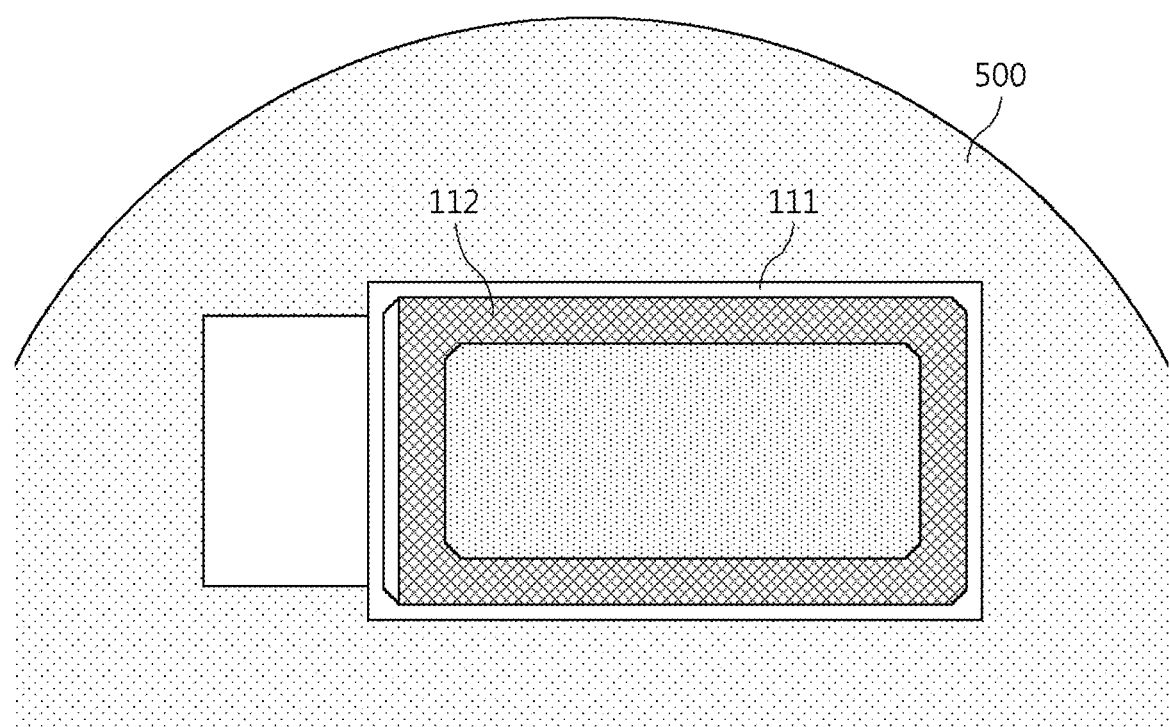
FIG. 3 is a top view before an electric part of the first embodiment of the fuel pump module according to the present invention is coupled.
Figure 4:
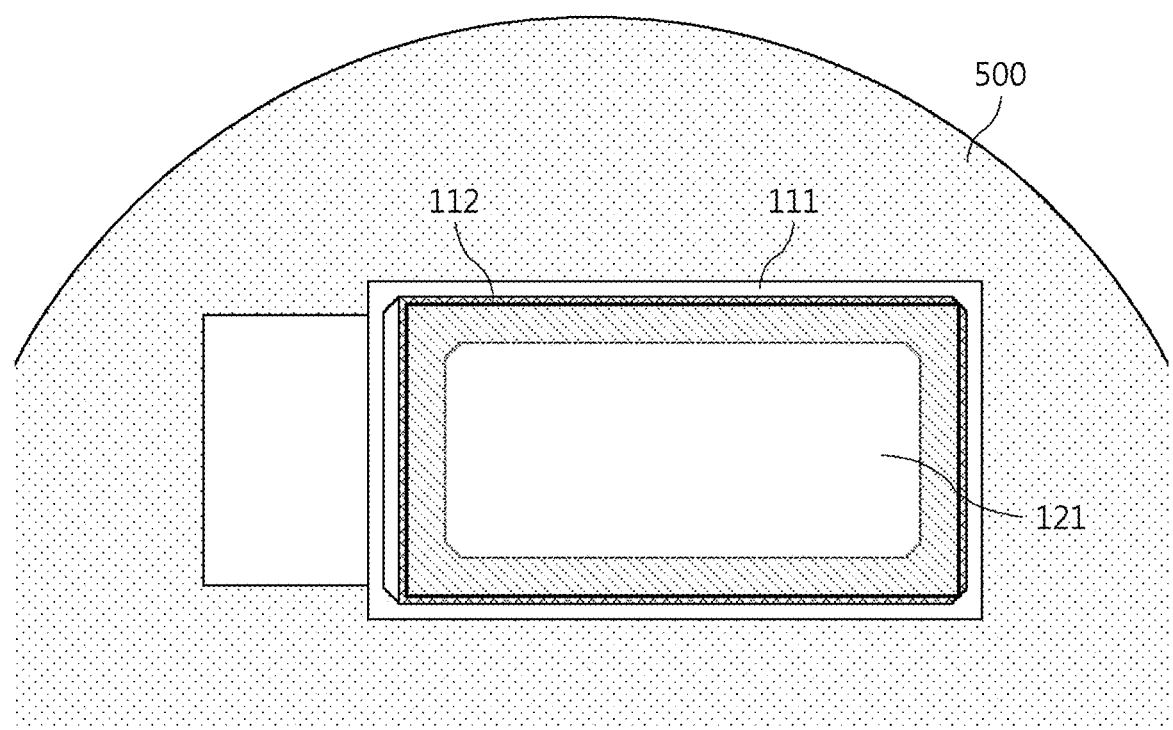
FIG. 4 is a top view after the electric part of the first embodiment of the fuel pump module according to the present invention is coupled.

In the present invention, the board 121 of the electric part 120 has an edge disposed over the potting part guide 112, thereby serving to divide an inner space of the storage part 110 into an upper space V1 and a lower space V2 together with the potting part guide 112. FIG. 2 is a cross-sectional view before a potting part and a heat dissipation part of the first embodiment of the fuel pump module according to the present invention are coupled, and FIGS. 3 and 4 are top views before/after an electric part of the first embodiment of the fuel pump module according to the present invention is coupled. As may be seen from FIGS. 2 to 4, as the potting part guide 112 is formed in a plate shape with a middle hole, there is no possibility of interference with an existing terminal 122 and the like, and therefore, the potting part guide 112 may be easily applied to an existing product. In addition, the inner space of the storage unit 110 may be separated vertically by simply placing the board 121 on the potting part guide 112.

The heat dissipation part 130 is disposed on an upper surface of the storage part 110 and discharges the heat generated from the electric part 120 to the outside. More specifically, the heat dissipation part 130 may include a heat sink 131 formed to have a size corresponding to an area of the storage part 110 to cover and seal an opened surface of the storage part 110, and a plurality of heat sink fins 132 formed on the heat sink 131.

The potting part 140 is formed by potting a liquid resin in the upper space V1, and serves to transfer the heat generated from the electric part 120 to the heat dissipation part 130. Since the liquid resin is in a liquid state at the time of potting, but is firmly fixed after being cured, the potting part 140 may serve as a molding material as well as a role of transferring the heat.

As is well illustrated in FIG. 1, in the present invention, the potting part 140 is not potted to the entire inner space of the storage part 110, but is only potted to the upper space V1.

Conventionally, the potting part 140 was formed in the entire inner space of the storage part 110, that is, the liquid resin was potted in both the upper space V1 and the lower space V2 based on FIG. 1. It is highly desirable that the heat generated in the electric part 120 is dissipated to external air through the heat dissipation part 130 along the liquid resin filled in the upper space V1. However, when the heat generated in the electric part 120 is transferred along the liquid resin filled in the lower space V2, the heat is transferred to the flange 500 before being dissipated to the air. However, as described above, in general, a material of the flange is POM, PPA, or the like, and an allowable temperature range thereof is considerably lower than that of a PCB or IC product. Accordingly, there was a problem that the flange is thermally deformed by the heat generated from the electric part 120 and transferred to the flange.

In the present invention, the inner space of the storage part 110 may be completely isolated to the upper space V1 and the lower space V2 by the board 121 and the potting part guide 112 using the potting part guide 112, thereby allowing the potting to be performed on only the upper space V1 at the time of potting. That is, the lower space V2 is left as an empty space in which the liquid resin is not potted and only the air is filled. The air is a material having a very low thermal conductivity, and therefore, the lower space V2 forms a kind of insulating layer. That is, as in the present invention, by forming the potting part 140 only in the upper space V1, heat dissipation to the outside may be smoothly performed and heat transfer to the flange may be effectively prevented. Accordingly, according to the present invention, a thermal deformation problem caused by excessive heat transfer to the flange may be actively suppressed.

A manufacturing method of the controller integrated type fuel pump module according to the present invention as described above will be briefly described step by step as follows.

First, an electric part installation operation in which an edge of the board 121 is disposed over the potting part guide 112 is performed. In the electric part installation operation, various processes such as connection between the terminal 122 and the board 121 or other wirings may be further performed.

Next, a potting part installation operation in which the liquid resin is potted in the upper space V1 of the inner space of the storage part 110 vertically divided by the board 121 and the potting part guide 112 is performed. As is well illustrated in FIGS. 2 to 4, the inner space of the storage part 110 is divided into the upper space V1 and the lower space V2 that are completely isolated from each other by the board 121 and the potting part guide 112. Therefore, even if the liquid resin is potted to the upper space V1, the liquid resin does not invade the lower space V2, and therefore, the lower space V2 may remain as an empty space filled with only air smoothly.

Finally, a heat dissipation part installation operation in which the heat dissipation part 130 is disposed on the upper surface of the storage part 110 is performed. As illustrated in FIG. 1, the heat sink 131 is formed to have a size corresponding to an area of the storage part 110 and is formed to cover an opened surface of the storage part 110. The storage part 110 and the heat dissipation part 130 may be coupled to each other, for example, by bonding an edge of the heat sink 131 to an upper end of the storage member 111. The present invention is not limited thereto, and the coupling between the storage part 110 and the heat dissipation part 130 may be variously changed and implemented such as a screwing coupling or a separate catching structure.

[2] Second Embodiment

Figure 5:
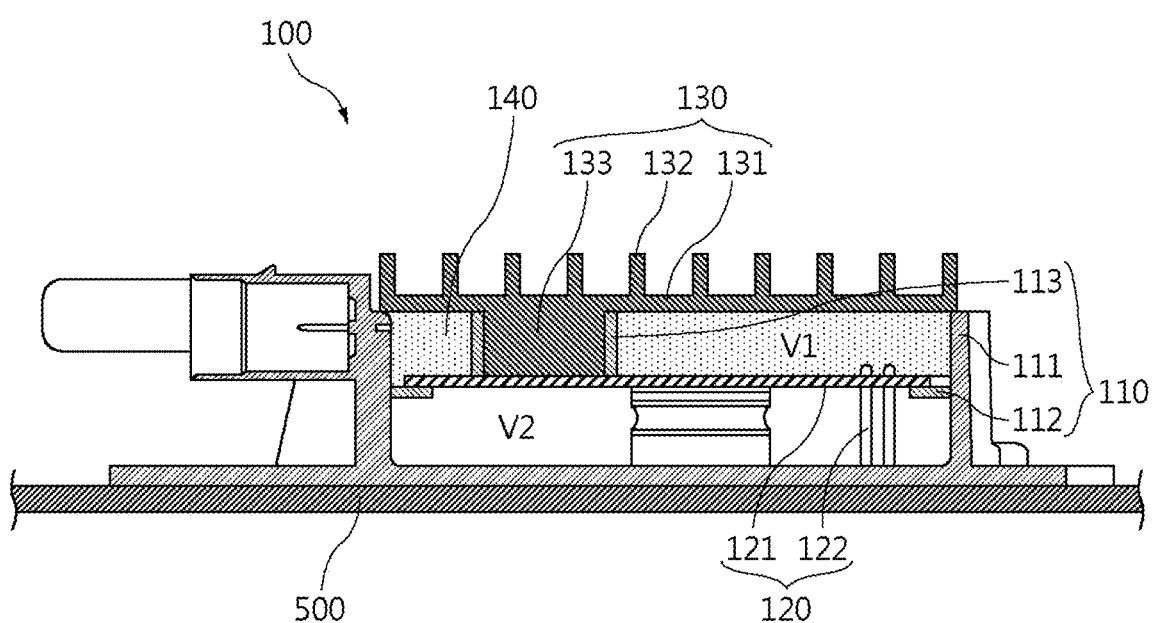
FIG. 5 is a cross-sectional view of a second embodiment of the fuel pump module according to the present invention.
Figure 6:
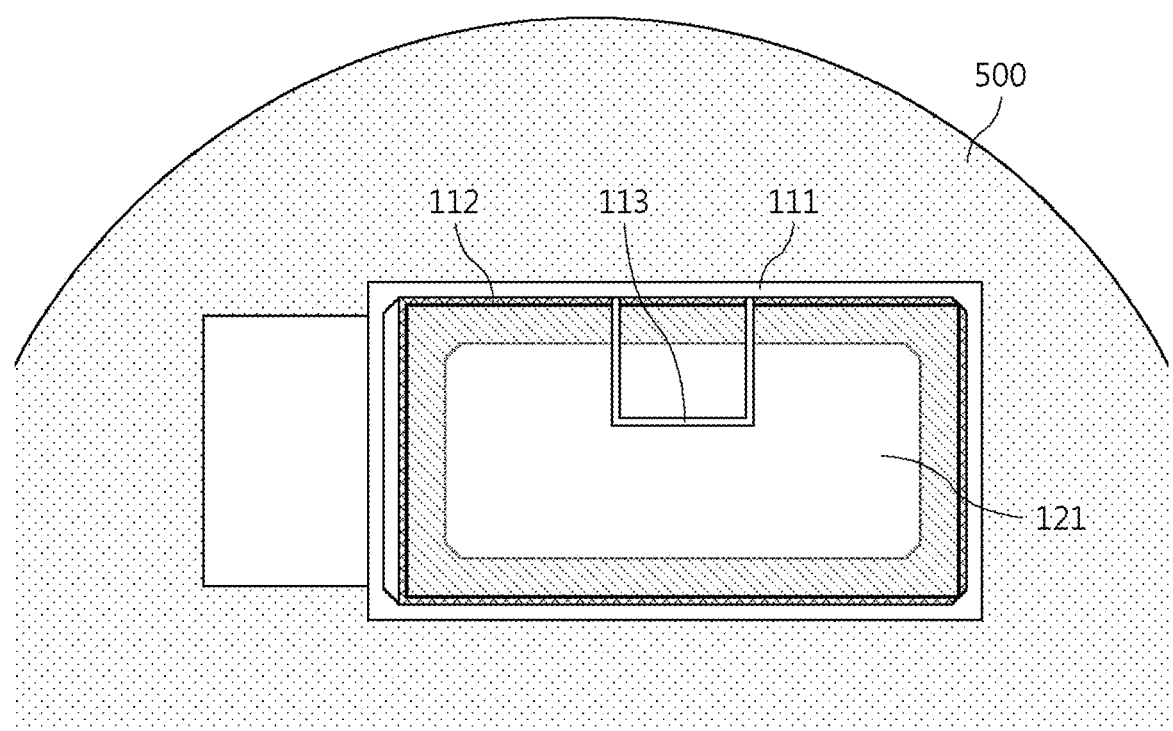
FIG. 6 is a top view of the second embodiment of the fuel pump module according to the present invention.

FIG. 5 illustrates a cross-sectional view of a second embodiment of the fuel pump module according to the present invention and FIG. 6 is a top view of the second embodiment of the fuel pump module according to the present invention. As may be easily seen in comparison with FIG. 1 and the like, in the second embodiment, a heat dissipation part guide 113 and a connection part 133 are further formed in the storage part 110 and the heat dissipation part 130.

A more detailed description is as follows. In the second embodiment, the heat dissipation part 130 includes the connection part 133 formed on a lower portion of the heat sink 131 and having a lower surface in surface contact with the electric part 120, and the storage part 110 includes the heat dissipation part guide 113 formed in a shape corresponding to the connection part 133. At this time, the connection part 133 is inserted into the heat dissipation part guide 113 as illustrated in FIG. 5.

As illustrated in FIG. 5, the connection part 133 has the lower surface in surface contact with the electric part 120. In the first embodiment, the electric part 120 and the heat dissipation part 130 do not directly contact, and therefore, the heat generated from the electric part 120 is transferred to the heat dissipation part 130 by being conducted through the potting part 140. On the other hand, in the second embodiment, the heat conduction is performed through the potting part 140 similar to the first embodiment as well as in regions other than the connection part 133, but in the connection part 133, the heat may be conducted through the connection part 133 directly. In general, it is well known that the thermal conductivity of a metal material is very high compared to a resin material. In general, considering that the heat dissipation part 130 is made of the metal material, when the connection part 133 is formed as described above, it may be easily seen that a heat conduction efficiency of the heat generated from the electric part 120 reaches the heat sink 131 and the heat sink fins 132 is much better.

In a case in which the heat dissipation part guide 113 is integrally formed with the storage member 111, since it may be difficult to dispose the electric part 120 in the storage part 110, the heat dissipation part guide 113 is preferably made of a member separate from the storage member 111. At this time, in the second embodiment, as is illustrated in the top view of FIG. 6, the heat dissipation part guide 113 may be formed in a U-shaped bent plate shape, and in this case, the heat dissipation part guide 113 may be easily coupled to the electric part 120 by an adhesive or the like.

A manufacturing method of the controller integrated type fuel pump module according to the present invention including the heat dissipation part guide 113 and the connection part 133 as described above will be briefly described step by step as follows.

First, as in the first embodiment, an electric part installation operation is performed.

Next, a guide installation operation in which the heat dissipation part guide 113 is installed in the upper space V1 of the inner space of the storage part 110 vertically divided by the board 121 and the potting part guide 112 is performed. In the case of the second embodiment, in the guide installation operation, the heat dissipation part guide 113 may be coupled to the electric part 120.

Next, a potting part installation operation in which the liquid resin is potted in a space other than the heat dissipation part guide 113 of the upper space V1 is performed. The potting part installation operation in the second embodiment is substantially similar to the potting part installation operation in the first embodiment, but in the second embodiment, the liquid resin is not potted to the space isolated by the heat dissipation part guide 113. This is to enable the connection part 133 to be smoothly inserted into the corresponding space.

Finally, a heat dissipation part installation operation in which the connection part 133 is inserted into the heat dissipation part guide 113 and the heat dissipation part 130 is disposed on the upper surface of the storage part 110 is performed. The heat dissipation part installation operation in the second embodiment is substantially similar to the heat dissipation part installation operation in the first embodiment, but a process in which the connection part 133 is inserted into the heat dissipation part guide 113 is further performed.

Third Embodiment

Figure 7:
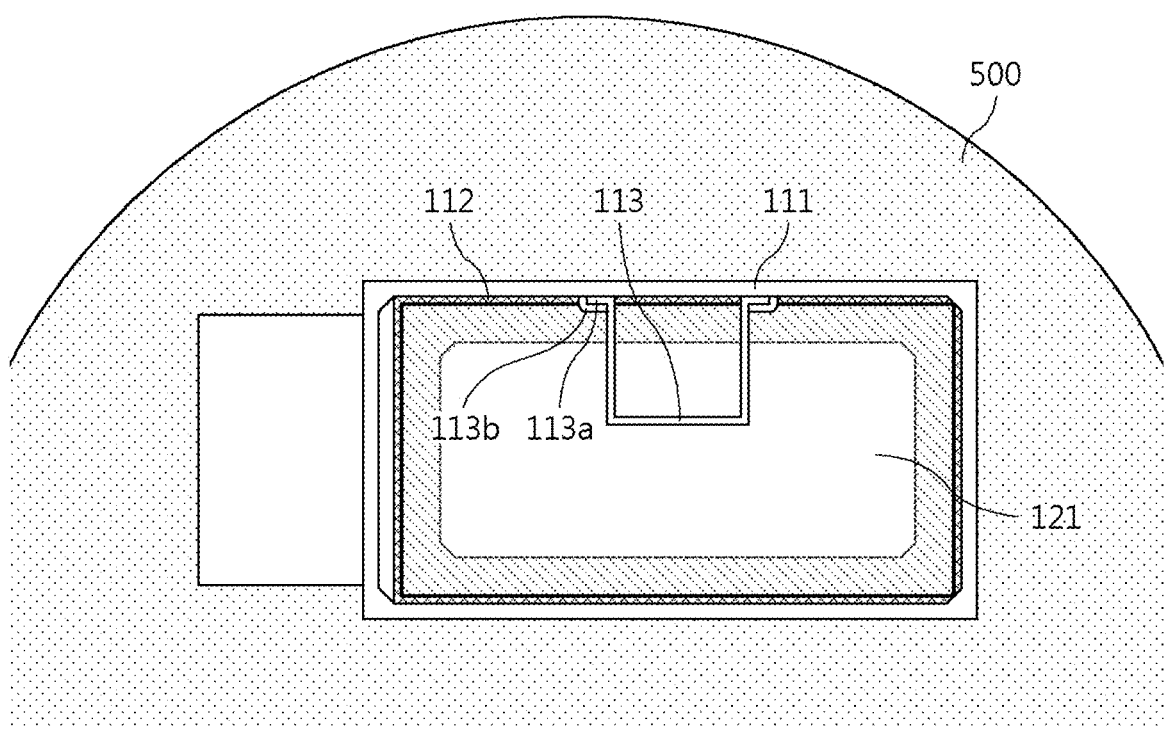
FIG. 7 is a top view of a third embodiment of the fuel pump module according to the present invention.

FIG. 7 illustrates a top view of a third embodiment of the fuel pump module according to the present invention.

The third embodiment is substantially similar to the second embodiment, but the heat dissipation part guide 113 is coupled to the storage member 111 through a separate structure. More specifically, in the third embodiment, a coupling protrusion 113a that is in contact with the inner surface of the storage member 111 is formed at an end of the heat dissipation part guide 113, and a coupling groove 113b into which the coupling protrusion 113a is inserted is formed on the inner surface of the storage member 111. At this time, the coupling protrusion 113a is fitted into the coupling groove 113b so that the heat dissipation part guide 113 is coupled to the storage member 111.

In the second embodiment, since only the heat dissipation part guide 113 needs to be manufactured separately, the storage member 111 may use the same product as in the related art, and therefore, there is an advantage that compatibility is higher. However, in a process of adhesively fixing the heat dissipation part guide 113 to the electric part 120, a problem in that a position thereof is slightly deviated from a regular position may occur, and in this case, when the connection part 133 is inserted into the heat dissipation part guide 113, there is a possibility that the upper surface of the storage member 111 is not completely covered with the heat sink 131 and is disposed to be twisted from the heat sink 131. In the case in which the coupling between the storage member 111 and the heat sink 131 is made by means such as an adhesive, there will be no major problem even if the alignment is slightly broken. However, for example, in the case in which the coupling between the storage member 111 and the heat sink 131 is made by means such as screw coupling, if the alignment is broken as described above, screw holes may not fit with each other, which may cause a problem that the screwing coupling is impossible.

In the third embodiment, the coupling groove 113b is formed in the storage member 111, the coupling protrusion 113a is formed at the end of the heat dissipation part guide 113, and the coupling protrusion 113a is fitted into the coupling groove 113b, thereby coupling the heat dissipation part guide 113 and the storage member 111 to each other. Therefore, initially, as long as a position where the coupling groove 113b is formed is accurately designated, the alignment may be easily performed by simply inserting the coupling protrusion 113a into the coupling groove 113b. In addition, instead of a process such as applying an adhesive to a lower surface of the heat dissipation part guide 113 and placing the heat dissipation part guide 113 at a regular position, the coupling is completed by only a very simple process of inserting the coupling protrusion 113a into the coupling groove 113b, and thus the difficulty of the process may also be significantly reduced.

A manufacturing method of the controller integrated type fuel pump module according to the present invention including the heat dissipation part guide 113 and the connection part 133 as described above will be briefly described step by step as follows. In the third embodiment, as in the second embodiment, the electric part installation operation, the guide installation operation, the potting part installation operation, and the heat dissipation part installation operation are performed in this order, but as the structure of the heat dissipation part guide 113 is changed, the guide installation operation is slightly different. Specifically, in the guide installation operation in the third embodiment, the coupling protrusion 113a is fitted to the coupling groove 113 so that the heat dissipation part guide 113 is coupled to the storage member 111.

[4] Experimental Results

Hereinafter, actual simulation results that may be seen that the thermal deformation of the flange may be effectively prevented by improving the structure of the fuel pump module according to the present invention will be described.

As described above, in general, the material of the flange is POM, PPA, or the like, and the allowable temperature range thereof is considerably lower than that of the PCB or IC product. Therefore, when the liquid resin, which serves as the heat dissipation member and the molding member, contacts the flange to transfer heat, there was a problem in that thermal deformation occurs due to the flange receiving excessive heat.

Figure 8:
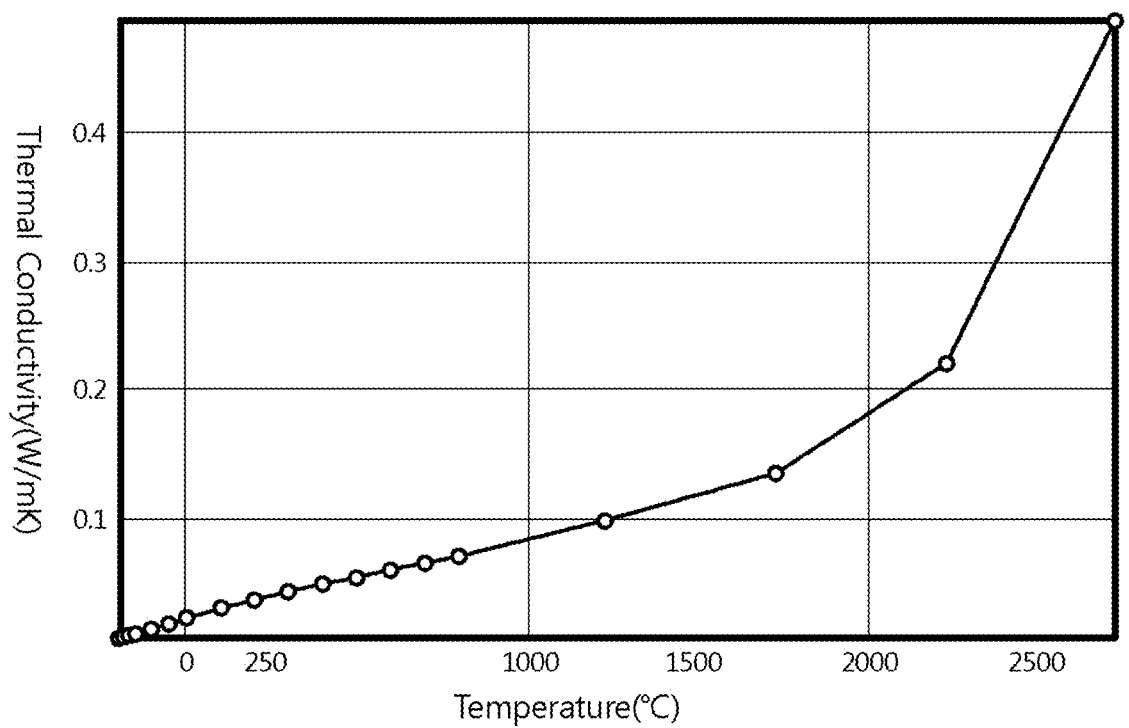
FIG. 8 is a graph of thermal conductivity of air.

The thermal conductivity of liquid resin varies depending on the material, but in order to serve as the heat dissipation member, the liquid resin basically has the thermal conductivity of a certain level or more so that thermal conduction may be smoothly performed. Meanwhile, FIG. 8 is a graph of thermal conductivity of air, and as is well illustrated in FIG. 8, the thermal conductivity of air is so low that it does not exceed 0.4 even when a temperature rises to 2500° C., and the insulation effect is excellent.

In the present invention, by using the points described above, the potting part 140 is formed in the space between the electric part 120 and the heat dissipation part 130, that is, the upper space V1, and the empty space filled with the air without potting the liquid resin is formed in the space between the electric part 120 and the flange 500, that is, the lower space V2. Accordingly, the heat generated from the electric part 120 is conducted to the potting part 140 filled in the upper space V1 and is smoothly discarded to the outside through the heat dissipation part 130, while it is possible to effectively prevent heat transfer to the flange 500 because the lower space V2 is insulated by the air gap.

Figure 9:
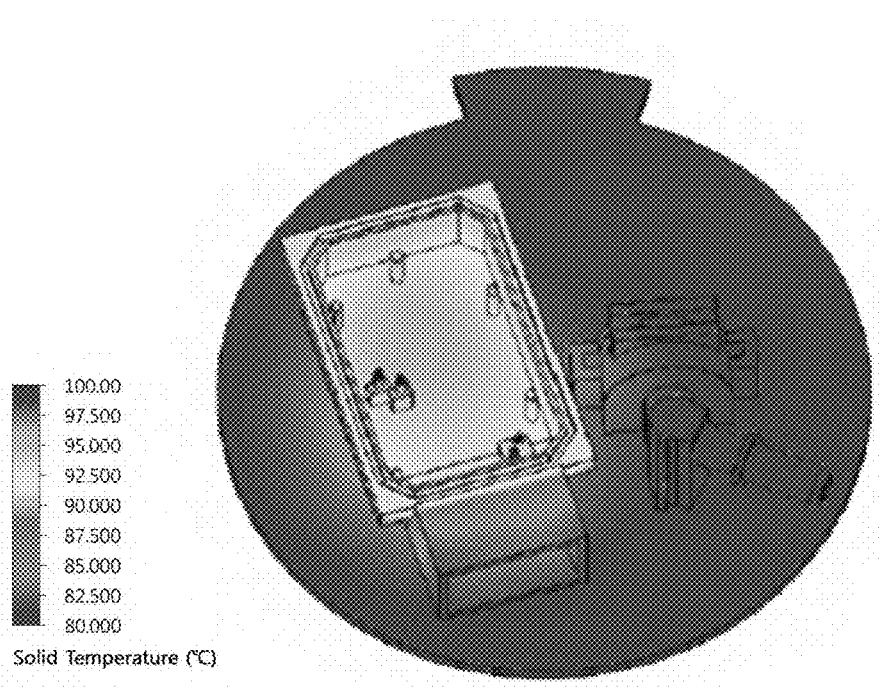
FIG. 9 is an example of flange temperature distribution by heat generation in a conventional fuel pump module.

FIG. 9 illustrates an example of flange temperature distribution by heat generation in a conventional fuel pump module. FIG. 9 may be an experimental result in the related art document described above, that is, in the fuel pump module in a form in which the liquid resin is filled in both the upper space and the lower space. As is well illustrated in FIG. 9, it may be seen that in the related art, the thermal conduction is smoothly performed as much as the liquid resin is filled in the lower space, and the entire temperature of a flange region in contact with the fuel pump module is uniformly formed at about 93 to 95° C. (yellow to orange). In such a temperature range, it is easy to cause thermal deformation of the flange, and in particular, when the thermal deformation occurs in a portion in contact with an edge of the fuel pump module, several problems as described above, that is, structural instability due to a distortion of the flange and accompanying adverse effects, occur.

Figure 10:
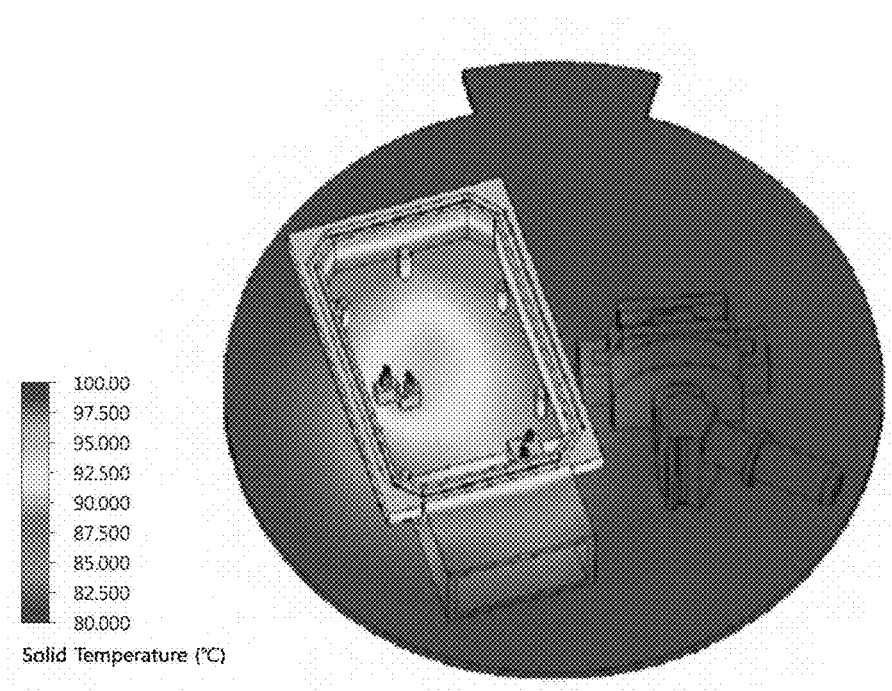
FIG. 10 is an example of flange temperature distribution by heat generation in a fuel pump module according to the present invention.

FIG. 10 illustrates an example of flange temperature distribution by heat generation in a fuel pump module according to the present invention. In the fuel pump module according to the present invention, it may be seen that the temperature is 93 to 95 (yellow to orange) in a portion of the electric part where the heat is severely generated, that is, a portion where the FET or the terminal is formed, but a temperature distribution of about 87 to 90° C. (green to yellow) is achieved in other regions. That is, as illustrated in FIG. 10, it may be seen that a slightly higher temperature is formed in a central portion of the fuel pump module, but a significantly lower temperature is formed than an existing temperature in a periphery. The problem of structural instability due to the thermal deformation of the flange described above will be easily described. In a portion where the flange and the fuel pump module are coupled to each other, the flange becomes more thermally deformed, resulting in distortion. At this time, as illustrated in FIG. 10, in the present invention, since the significantly lower temperature is formed in the periphery of the fuel pump module, the risk of distortion in a coupling surface between the flange and the fuel pump module may be greatly reduced.

According to the present invention, the heat transfer from the board to the flange may be minimized through the thermal insulation effect by the air gap by improving the structure in the storage part of the controller to form the air gap between the board and the flange in the controller formed integrally with the fuel pump module. Specifically, according to the present invention, the guide part for vertically dividing the space in the controller in which the electronic components are stored is formed, and the heat dissipation member is potted only to the upper space divided by the guide part and the board, while the lower space is an empty space in which the air gap is formed. Accordingly, the heat generated from the electronic components such as the board is actively discarded to the outside through the heat sink along the liquid resin filled in the upper space and is insulated by the air gap in the lower space, thereby minimizing the heat transfer to the flange.

Further, according to the present invention, as the heat transfer to the flange is minimized as described above, the thermal deformation of the flange may be effectively prevented. In general, since the material of the flange has a lower allowable temperature range than the material of the electronic components such as the boards, the risk of thermal deformation is high, and as such, by minimizing the heat transfer to the flange, the risk of the thermal deformation of the flange may be greatly reduced.

According to the present invention, by effectively preventing the thermal deformation of the flange, problems accompanying the thermal deformation of the flange, that is, a structural stability imbalance problem, a component damage problem caused by out-of-design vibration caused by the structural imbalance, and the like may also be fundamentally excluded.

The present invention is not limited to the above-described embodiments, and may be variously applied. In addition, the present invention may be variously modified by those skilled in the art to which the present invention pertains without departing from the spirit of the present invention claimed in the claims.

DETAILED DESCRIPTION OF MAIN ELEMENTS

100: controller
110: storage part
111: storage member
112: potting part guide
113: heat dissipation part guide
113a: coupling protrusion
113b: coupling groove
120: electric part
121: board
122: terminal
130: heat dissipation part
131: heat sink
132: heat sink fin
133: connection part
140: potting part
500: flange

What is claimed is:

1. A controller integrated type fuel pump module in which a controller is integrally formed on a flange that fixes a fuel pump and a reservoir cup to a fuel tank, the controller integrated type fuel pump module comprising:
   wherein the flange further comprises an upper surface;
   a storage part including a storage member includes an upper surface opened and an inner space formed and a potting part guide protruding from an inner surface of the storage member, and formed on the upper surface of the flange;
   an electric part including a board having an edge disposed across the potting part guide to vertically divide the inner space of the storage part into an upper space and a lower space together with the potting part guide, and generating heat;
   a heat dissipation part disposed on the upper surface of the storage part and discharging heat generated from the electric part to an outside; and
   a potting part formed by potting a liquid resin to the upper space and transferring the heat generated from the electric part to the heat dissipation part,
   wherein the inner space of the storage part is isolated to the upper space and the lower space by the board and the potting part guide, thereby allowing the potting part to be performed on only the upper space and the lower space to be left as an empty space filled with only air so that the empty space forms an insulating layer and prevents heat transfer from the board which placed on an upper position to the flange which placed on a lower position.

2. The controller integrated type fuel pump module of claim 1, wherein the heat dissipation part includes:
   a heat sink formed to have a size corresponding to an area of the storage part to cover and seal the opened upper surface of the storage part; and
   a plurality of heat sink fins formed on the heat sink.

3. The controller integrated type fuel pump module of claim 2, wherein an edge of the heat sink is bonded to an upper end of the storage member.

4. The controller integrated type fuel pump module of claim 2, wherein the heat dissipation part includes a connection part formed on a lower portion of the heat sink and having a lower surface in surface contact with the electric part,
   the storage part includes a heat dissipation part guide formed in a shape corresponding to the connection part, and
   the connection part is inserted into the heat dissipation part guide.

5. The controller integrated type fuel pump module of claim 4, wherein the heat dissipation part guide is made of a member separate from the storage member and is coupled to the electric part.

6. The controller integrated type fuel pump module of claim 4, wherein the heat dissipation part guide is made of a member separate from the storage member,
   a coupling protrusion that is in contact with the inner surface of the storage member is formed at an end of the heat dissipation part guide, and a coupling groove into which the coupling protrusion is inserted is formed on the inner surface of the storage member, and
   the coupling protrusion is fitted into the coupling groove so that the heat dissipation part guide is coupled to the storage member.

* * * * *